3,016,713
METHOD OF TREATING SOIL WITH AQUEOUS SLURRY OF LATTICE CLAY AND ANIONIC POLYELECTROLYTE
John M. Deming, Robertson, Mo., assignor to Monsanto Chemical Company, St. Louis, Mo., a corporation of Delaware
No Drawing. Filed May 15, 1957, Ser. No. 659,439
5 Claims. (Cl. 61—1)

This invention relates to the prevention of water infiltration into porous soil surfaces. More specifically the invention relates to compositions which are readily dispersible in water to make suspensions useful in preventing the seepage of water from conduits or reservoirs. More particularly the invention relates to lining of irrigation canals and other excavations in porous surface strata.

It has long been known that bentonite and other expanding lattice clays can be prepared in aqueous mixtures or suspensions, which can be used for lining irrigation canals and for rendering impervious the walls and bottoms of stock ponds and other water reservoirs. The usual procedure involved in these practices requires the preparation of the suspension, applying it to the porous surface and permitting the suspending water to drain leaving on the surface a coating or layer of bentonite. The surface so prepared is relatively resistant to the percolation of water, but the bentonite will eventually be eroded and redispersed in the water, thereby making necessary periodic renewals of the lining or surface coating.

Other difficulties may be encountered in periods of low water level in the canal or water storage area. The portions of the protective coating exposed to a dry atmosphere, or particularly to the drying effect of direct sunlight, may become hard and brittle, and due to the inherent contractual properties of the bentonite, the surface may check forming wide cracks and many severed segments of the surface coating. Upon reflooding the area or otherwise moistening the surface coating, the original impervious surface is not restored, and the canal or reservoir will not be effective in retaining water unless relined or patched with more of the aqueous bentonite.

One purpose of the invention is to provide a bentonite surface coating which is resistant to checking upon drying, more permanent with respect to its water-impervious properties, and more resistant to redispersion in water. A further purpose is to provide a composition which is readily dispersed in water and which is completely homogeneous and resistant to settling. A further purpose of the invention is to provide thin aqueous slurries of bentonite which have the ability to penetrate porous layers and deposit the suspended bentonite in the interstitial spaces. A still further purpose is to provide a means of permanently lining irrigation ditches and sealing the soil beneath water storage ponds or other reservoirs. The invention has for its fundamental purpose the saving of water in areas of water insufficiency, and the more efficient use of water in irrigated areas.

In accordance with this invention it has been found that bentonite or other expanding lattice clays such as montmorillonite, hectorite, saponite, nontronite, and other clay type materials in which the particles are flat plate-like crystals dispersible in water with anionic polyelectrolytes to form stable suspensions. The clays known as expanding lattice clays, are those in which the c-axis spacing when saturated with water reaches a maximum greater than 25 angstrom units. For the purpose of this invention the combinations including the anionic polyelectrolytes are much more efficient and more useful than the bentonites alone.

For practicing this invention it is necessary to mix the expanding lattice clay and the anionic polyelectrolyte in specific ratios, for example from 0.01 to 0.1% of polyelectrolyte based on the weight of the bentonite. Optimum performance can be obtained by the use of from 0.025 to 0.05% of polymer.

Useful anionic polyelectrolytes are the water-soluble polymers of olefinic structure, that is with a structure prepared by the polymerization of at least one compound with a single aliphatic unsaturated group, which compounds are polymerized to a weight average molecular weight of at least 10,000. To be water-soluble these polymers must necessarily have substituents such as carboxy acids, carboxy acid salts and carboxy acid anhydrides, and must in contact with water ionize to form polymeric ions with a substantial plurality of negatively charged sites. One type of compound useful in the practice of this invention is the polymer of a carboxylic acid, such as acrylic acid, methacrylic acid, crotonic acid and the sodium, potassium, calcium and ammonium salts of said polymeric acids. Copolymers of these acids, or salts thereof, and other olefinic compounds such as ethylene, propylene, isobutylene, styrene, α-methyl styrene, vinyl acetate, vinyl formate, vinyl alkyl ethers, alkyl acrylates and alkyl halides may also be used in the practice of this invention. Copolymers of more than two olefinic substances will be useful provided that at least one of the compounds contains carboxy anhydride or carboxy salt nuclei or other nuclei which are capable of being converted chemically into one of the said carboxy structures.

Another very useful type of polymer is the copolymers of dicarboxylic acid anhydride or derivatives thereof. These polymers are usually comprised of equal molar proportions of the dicarboxylic acid, for example maleic, fumaric, itaconic, citroconic and aconitic acids, the alkali metal, alkaline earth metal and the salts of these acids, and the partially esterified dicarboxylic acids of the type mentioned, and other olefinic monomers copolymerizable therewith, for example, ethylene, propylene, isobutylene, styrene, α-methyl styrene, vinyl acetate, vinyl chloride, vinyl formate, vinyl alkyl ethers, alkyl acrylates and alkyl methacrylates. If desired one of the comonomeric compounds may be an amide or a quaternary ammonium salt, either substituent of which has a cationic influence, but copolymers involving such cationic substituents must necessarily have present carboxy, carboxy salt or carboxylic anhydride nuclei to overcome the cationic effects and render the whole polymer anionic. Alternatively the maleic acid may be esterified provided that ionizable carboxy groups are present in the comonomer or on the maleic acid grouping, such as in the copolymer of vinyl acetate and the partial methyl ester of maleic acid. If maleic anhydride is copolymerized, it will be hydrolyzed to the acid when the aqueous bentonite slurries are prepared.

One important type of these copolymers is the poly-carboxylic acids or salts thereof prepared by the hydrolysis of polyacrylonitrile, or the hydrolysis of copolymers of acrylonitrile and other olefinic monomers. In the preparation of these polymers it is necessary for the hydrolysis to proceed past the amide stage, where the polymers are cationic, to the carboxy acid or carboxy acid salt, which are anionic and therefore useful in the practice of this invention. The hydrolysis may be effected with acids as catalysts, or in the presence of alkali metal hydroxides where the corresponding alkali metal polyacrylates are produced, such as sodium polyacrylate. Alternatively the alkali metal polyacrylates may be prepared by first polymerizing acid and neutralizing the resulting polymer.

Another useful polymer is the polyacrylamide, but to be effective it must have some carboxy substituents. The useful compounds of this type may be prepared by partial hydrolysis of polyacrylonitrile or by polymerization of acrylamide under conditions favoring hydrolysis, or by a polymerization followed by a separate hydrolysis step.

Although the above described polymers are in general useful, preferred products are those of high molecular weight for example with weight average molecular weights in excess of 10,000. In addition to the above described polymers are other polymers which are water-soluble, having a polymeric structure derived by olefinic polymerization, and capable of ionization to form high molecular weight ions with a large number of ionization sites along the polymeric chain. Compounds having the latter characteristic are herein referred to as "polyelectrolytes" or "polymeric electrolytes."

Combinations of the said anionic polyelectrolyte and the expanding lattice clay in the above described ratios are very useful compositions which are dispersible in water, which dispersion is colloidal in nature. The suspension of finely divided particles in water is stabilized in dispersed state by the presence of the anionic polymer, which reinforces an inherent mutual repellency of the clay particles and prevents the flocculation or agglomeration of the clay particles, thereby insuring the proper effect in the practice of this invention. This dispersed state can be further stabilized through the use of dispersing agents such as the poly phosphates.

The valuable combination of the bentonites and anionic polyelectrolytes may be dispersed in water prior to its use in such proportions that the bentonite is present to the extent of 0.1 to 2.0% based on the water. Preferred aqueous suspensions may have from 0.2 to 0.5 percent bentonite and from 0.00005 to 0.00025% of the anionic polyelectrolyte. In the preparation of water impervious soil surface, the surface is first conformed to the desired shape, for example by excavating to form a pond of the desired shape and size, or by trenching, scraping or otherwise forming the irrigation canals in the desired shapes. The utility of the practice of the invention will depend upon the degree of porosity of the soil, and it will be evident that in areas of low rainfall and water scarcity, the invention will be useful in treating all surface soils which can be penetrated to any extent by water. Similarly it will be understood that there is a definite relationship of the porosity of the soil to the extent of treatment, and the soils can be treated so as to provide the amount of resistance to percolation that is commensurate with the cost of treatment and the value of the water saved.

In the practice of this invention a body of water is mixed with the polymer-bentonite combination in such a quantity as will conform to the critical limits defined above, and the resulting suspension is flowed into the areas to be treated and permitted to penetrate the porous soil over the areas which in the normal use will contact the water. The suspension of bentonite and polymer in the water will have a sufficiently low viscosity to flow free into the interstitial spaces in the soil, where it will deposit the bentonite and the polymer in proportions substantially identical to the proportions in the polymer-bentonite mix prior to dispersion in the water. In the interstitial spaces effective blocking of the water channels will be achieved by the bentonite in accordance with its useful and expected effect, but the anionic polymer which served as the dispersing agent will become adsorbed on the bentonite particles, and by a physical or pseudochemical action more or less permanently lock the clay particles in the desired positions.

It will be evident that the less porous surface soils will be penetrated to a lesser extent than the more pervious areas. In this manner less polymer will be deposited where it is not needed, and substantial quantities of polymer and bentonite will be deposited in the interstitial spaces which are more permeable to water, and which require larger proportions of the polymer-bentonite mixture to effectively seal the soil. After all of the bentonite slurry containing dissolved polymer has percolated into the soil to that extent which produces the degree of sealing desired, or the equilibrium point, the excess may be removed from the stationary areas or flushed on through the irrigation canals to untreated areas. In this manner a uniform surface can be obtained with any desired degree of water permeability.

The soil surface, such as the excavated area of stationary ponds or lakes, or the sides and bottoms of the irrigation canals are coated with a relatively thin continuous film, although the sealing is accomplished by the composition which penetrates the soil and extends into the interstitial spaces of the soil to a substantial depth. The porous soil and bentonite becomes a single integral unit which is rigid and resistant to fracture, because of the reinforced soil structure which extends from the untreated soils up to the surface of this said continuous surface film. The resistance to drying through exposure to the air or the direct rays of sunlight is minimized by the capillary action of the mixture from below to the surface or laterally from the flooded portion to the protected layers above the water level, and thereby all of the objections to the prior art method of coating with a separate non-bonded surface layer are obviated.

Further details of the practice of this invention and the results to be achieved are set forth in the following examples.

Example 1

Meramec sand, typical of porous surface soil found in irrigated areas was used to study infiltration rates and the effect of bentonite in preventing infiltration of water. Slurries of bentonite at concentrations of 0.25, 0.5, 1.0, 2.0 and 4.0 percent by weight were used to treat areas of porous soil two feet deep. Using $4.00 per acre foot as cost of water and $25.00 per ton for bentonite, the following cost calculation of water losses at 20 tons ($500) per acre were made from the data using 900 irrigation hours as the life of a treatment.

| Concentration of slurry | Infiltration rate inches/hour | Cost of water lost | Savings |
| --- | --- | --- | --- |
| 0 | 60 | $18,000 | --------- |
| 0.25 | 60 | 18,000 | 0 |
| 0.50 | 50 | 15,000 | 3,000 |
| 1.00 | 30 | 9,000 | 6,000 |
| 2.00 | 15 | 3,500 | 14,500 |
| 4.00 | 1.5 | 500 | 17,500 |

When up to and including 2 percent bentonite slurries are used, the water infiltration or seepage reaches equilibrium at a high rate of flow without sealing.

Using a 4 percent bentonite slurry the water losses were measured while percolating the slurry through the porous soil. The following table describes the relationship of water savings to the cost of treatment.

| Bentonite tons/acre | Cost of water lost | | Bentonite treatment cost | | Net gain or loss |
|---|---|---|---|---|---|
| | Total water lost | Increment saving | Total | Increment | |
| 0 | $18,000 | | | | |
| 4 | 6,000 | $12,000 | $100 | 100 | +$11,900 |
| 8 | 3,500 | 2,500 | 200 | 100 | +2,400 |
| 12 | 2,200 | 1,300 | 300 | 100 | +1,200 |
| 16 | 1,300 | 900 | 400 | 100 | +800 |
| 20 | 800 | 700 | 500 | 100 | +600 |
| 24 | 500 | 300 | 600 | 100 | +200 |
| 28 | 350 | 150 | 700 | 100 | +50 |
| 32 | 240 | 110 | 800 | 100 | +10 |
| 36 | 170 | 70 | 900 | 100 | −30 |
| 40 | 120 | 50 | 1,000 | 100 | −50 |

It is evident from the above data that a slurry of a concentration of about 4 percent and application levels of about 24 to 36 tons per acre are required for effective use of bentonite alone to seal porous surface soil.

Example II

Bentonite was mixed with 0.05 percent by weight of a copolymer of equal moles of isobutylene and maleic anhydride. Suspensions of the mixture in water were prepared with 0.15, 0.25, 0.5, 1.0, 2.0 and 4.0 percent by weight concentrations. Using soil surfaces identical to those described and used in Example I, these slurries were percolated into the soil from the surface. The 0.15 percent slurry came to equilibrium at a seepage rate of 10 inches per hour representing a loss of $3,000 per acre over a 900 hour period, and 40 tons per acre of bentonite was infiltrated without further improvement in sealing the soil.

The 4% slurry seals the soil with an application of about 1.5 tons of bentonite but only a surface film is obtained. This film is subject to erosion by flowing water or raindrop impact and soon loses its water sealing properties.

The slurries prepared with the concentration of from 0.25 to 2 percent did not leave an erodible surface film and did reach an equilibrium at a low infiltration rate. The flowing table shows the low infiltration rate and the relatively small amount of bentonite required to completely seal the soil when low concentrations are used.

| Slurry concentration, percent of bentonite-polymer | Total bentonite-polymer required to reduce seepage rate [1] to 0.2" per hour | Cost/acre |
|---|---|---|
| | Tons/acre | |
| 0.25 | 14 | $420 |
| 0.50 | 20 | 600 |
| 1.00 | 22 | 660 |
| 2.00 | 26 | 780 |

[1] Cost savings $17,970/acre per 900 hour period.

Thus it is evident that optimum concentration is the lowest which will enable an effective seal.

Example III

The procedure of Example II was repeated except that 0.5 percent of bentonite mixture with various proportions of isobutylene and maleic anhydride copolymer was used. Concentrations of polymer of 0.012, 0.025, 0.050, 0.1 and 0.2 percent (based on bentonite) were studied.

| Concentration of polymer and slurry | Tons of bentonite-polymer mixture required to reduce seepage rate [1] to 0.2" per hour | Treatment cost dol./acre |
|---|---|---|
| 0.012 | 41 | $1,050 |
| 0.025 | 17 | 425 |
| 0.05 | 20 | 525 |
| 0.10 | 24 | 840 |
| 0.2 | 29 | 1,300 |

[1] Cost savings $17,970/acre per 900 hours.

Thus at higher levels of bentonite concentrations the optimum polymer content is lower.

Example IV

The procedure of Example III was repeated to explore the effect of variation in polymer (isobutylene-maleic anhydride copolymer) when 0.25 percent slurries were used.

| Concentration of polymer | Tons of bentonite-polymer mixture required to reduce seepage rate [1] to 0.2"/hour | Treatment cost |
|---|---|---|
| 0.025 | [2] | [2] |
| 0.05 | 14 | $420 |
| 0.01 | 16 | 400 |

[1] Cost savings $17,970/acre per 900 hours.
[2] Very high.

Example V

Procedure of Example III was repeated except that 0.15% suspensions were used on 0.1 percent copolymer of isobutylene-maleic acid.

| Concentration of polymer | Tons of bentonite-polymer mixture required to reduce seepage rate [1] to 0.2"/hour | Treatment cost |
|---|---|---|
| 0.1 | 12 | $420 |

[1] Cost savings $17,970/acre per 900 hours.

Example VI

A series of soil percolation studies were made using bentonite with different polyelectrolytes and other polymers of high molecular weight which are water-soluble but not ionizable. The studies determined the relative concentrations of each polymer required to produce a minimum sealing effect. Using the isobutylene-maleic anhydride as the standard, the following values were observed.

Isobutylene-maleic anhydride copolymer _____ 1.0
Vinyl acetate-maleic anhydride copolymer _____ 1.3
Hydrolyzed polyacrylonitrile _____ 1.4
Polyacrylamide (hydrolyzed) _____ 2.2
Sodium alginate _____ 14.0
Carboxymethyl cellulose _____ 16.0

Thus the use of polyelectrolytes with bentonite produces more than a ten fold superior result than do other polymers which are not electrolytic. Furthermore the alginates are carboxymethyl cellulose, not being capable of adsorption on the clays, are leached out and decomposed by soil bacteria, and for this reason the effects in preventing water infiltration are not long lived.

What is claimed is:

1. A method of preventing seepage of water from excavations in porous soils, which comprises treating the soil surfaces of the said excavations with an aqueous slurry containing 0.1 to 2.0 percent by weight of an expanding lattice clay and from 0.00005 to 0.001 percent of a water-soluble anionic polyelectrolyte having a weight average molecular weight of at least 10,000 and a structure derived by the polymerization of at least one mono-olefinic compound through its aliphatic unsaturated group.

2. The method defined by claim 1 wherein the polyelectrolyte is a copolymer of isobutylene and maleic acid.

3. The method defined by claim 1 wherein the polyelectrolyte is a copolymer of vinyl acetate and a partial methyl ester of maleic acid.

4. The method defined by claim 1 wherein the polyelectrolyte is sodium polyacrylate prepared by the hydrolysis of polyacrylonitrile in the presence of sodium hydroxide.

5. The method defined by claim 1 wherein the polyelectrolyte is a polyacrylamide containing carboxy radicals in amount sufficient to make the polymer anionic.

References Cited in the file of this patent

UNITED STATES PATENTS

| | | |
|---|---|---|
| 2,716,094 | Morrill | Aug. 23, 1955 |
| 2,759,902 | Magnussen et al. | Aug. 21, 1956 |
| 2,801,983 | Dixon et al. | Aug. 6, 1957 |